(12) United States Patent
Manico et al.

(10) Patent No.: US 6,373,551 B2
(45) Date of Patent: Apr. 16, 2002

(54) SYSTEM AND METHOD FOR COMMUNICATION OF DIGITAL IMAGES GENERATED FROM PHOTOGRAPHIC FILM

(75) Inventors: Joseph A. Manico, Rochester; Craig S. Willand, Pittsford; Madhav Mehra, Rochester; Howard E. Bussey, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/800,157

(22) Filed: Mar. 6, 2001

Related U.S. Application Data

(63) Continuation of application No. 09/213,517, filed on Dec. 17, 1998, now abandoned.

(51) Int. Cl.[7] .................. G03B 27/80; G03B 27/52; G03B 27/32; G03B 17/24; G03B 17/26
(52) U.S. Cl. .................. 355/41; 355/38; 355/40; 355/77; 396/311; 396/319; 396/321; 396/511; 396/512
(58) Field of Search .................. 355/38, 40, 41, 355/77; 396/319, 321, 311, 511, 512

(56) References Cited

U.S. PATENT DOCUMENTS

| | | | |
|---|---|---|---|
| 4,920,376 A | * | 4/1990 | Yamamoto .................. 355/38 |
| 5,168,444 A | | 12/1992 | Cukor et al. |
| 5,184,227 A | | 2/1993 | Foley |
| 5,258,859 A | | 11/1993 | Wada et al. |
| 5,400,152 A | | 3/1995 | Manico et al. |
| 5,420,699 A | | 5/1995 | Yamanouchi et al. |
| 5,608,542 A | | 3/1997 | Krahe et al. |
| 5,647,552 A | * | 7/1997 | Takatori .................. 396/513 |
| 5,666,215 A | | 9/1997 | Fredlund et al. |
| 5,819,126 A | * | 10/1998 | Kitagawa et al. .......... 396/319 |
| 6,017,157 A | * | 1/2000 | Garfinkle et al. .......... 396/639 |

* cited by examiner

Primary Examiner—Russell Adams
Assistant Examiner—Khaled Brown
(74) Attorney, Agent, or Firm—Thomas H. Close

(57) ABSTRACT

A photographic system includes a photographic film having a unique identification code thereon. An identification tag is included with the photographic film; the identification tag bears a uniform resource locator that includes the unique identification code, and an associated password. The film is scanned after processing to generate a digital image and the unique identification code is associated with the digital image and stored in a digital storage device. A web server connected to the digital image storage device includes a resource identified by the uniform resource locator for accessing the digital image. A database accessible by the web server contains the unique identification code and the associated password wherein the resource is password protected and accessible by use of the password.

18 Claims, 5 Drawing Sheets

| FIG. 6A |
| FIG. 6B |

SYSTEM AND METHOD FOR COMMUNICATION OF DIGITAL IMAGES GENERATED FROM PHOTOGRAPHIC FILM

CROSS-REFERENCE TO RELATED APPLICATIONS

This is a continuation of application Ser. No. 09/213,517 filed Dec. 17, 1998, now abandoned by Joseph Manico et al.

FIELD OF THE INVENTION

This invention relates to the field of photography, and in particular to communication of digital photographic images to a remote destination after processing of photographic film and for communicating with a customer of a file processing service for picture previewing and selection.

BACKGROUND OF THE INVENTION

In a traditional photofinishing operation, a customer brings in his/her film to be processed and printed. Several steps are necessarily taken by the customer to actually receive his/her finished prints where some of these steps are tedious, time consuming, and otherwise inconvenient. With the advent of networked processors it has become possible to enter a customer's home via the networked computer to permit a degree of interfacing with a film processing service provider. One such provider is Eastman Kodak Company which offers a service called PhotoNet. A customer provides the photoprocessing service with a source of developed pictures that are scanned and stored for access via the Internet. Access to the customer's file may be selectively granted to others having a networked computer, for example, relatives and friends for viewing and downloading.

Currently available photographic 240IX film (Advanced Photo System) allows the recording of auxiliary information on a magnetic layer on the film. It has been suggested to provide a system that permits the customer to record his/her electronic address on the film such that a film processor could almost instantly make available for viewing a digitized version of the images that have been developed from the customer's film and to additionally permit the customer to communicate print ordering instructions to the film processor which prints can be either picked up at a later convenient time or delivered by conventional means.

A problem with these approaches is that if a photographer does not have a personal Internet account or e-mail address, this type of service is not available to her. Another problem with this suggested approach is that there is no way for a customer to proactively determine the status of their order. The first possibility that they have to communicate with the system is when they receive an e-mail notice that they have pictures waiting. Another problem is that traditional e-mail is not a secure communication process. Anyone who sees the e-mail message to the customer can gain access to the images. It is well known that e-mail addresses are prone to transcription errors resulting in delivery to an unintended party or not delivered at all. A still further problem is that if a persons e-mail address changes after submitting the order and before receiving the message from the service provider, access to the images may be frustrated. Basically, there is no guarantee that e-mail will reach its intended recipient.

There is a need therefore for an improved system and method of distributing digital images generated from photographic film.

SUMMARY OF THE INVENTION

The shortcomings noted above are overcome according to the present invention by providing a photographic system and method that includes a photographic film having a unique identification code thereon. An identification tag is included with the photographic film. The identification tag bears a uniform resource locator that includes the unique identification code, and an associated password. The film is scanned after processing to generate a digital image and the unique identification code is associated with the digital image and stored in a digital storage device. A web server connected to the digital image storage device includes a resource identified by the uniform resource locator for accessing the digital image. A database accessible by the web server contains the unique identification code and the associated password wherein the resource is password protected and accessible by use of the password.

ADVANTAGES

The present invention is advantageous in that it provides a system that is more secure than the current systems. It allows photographers without their own Internet account, or e-mail address to use the service at a public facility, such as a public library, publicly accessible terminal, or computer kiosk, or use of a friend's or associate's computer. The URL and Password and database to link film ID with passwords are assigned by the manufacturer of the film. The scanner/code reader automatically assigns URL's and uses the manufacturer provided database to verify passwords. There is also a security benefit of having the film manufacturer provide the user the only hardcopy of the URL address and password.

DETAILED DESCRIPTION OF THE INVENTION

Figure 1:
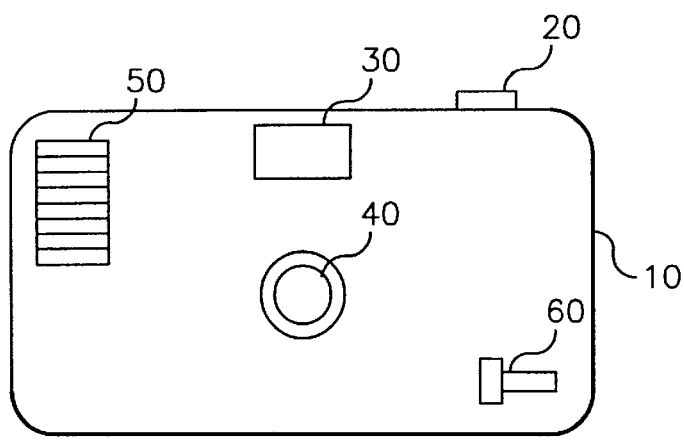
FIG. 1 is a front view of a "One Time Use Camera" (OTUC)
Figure 2:
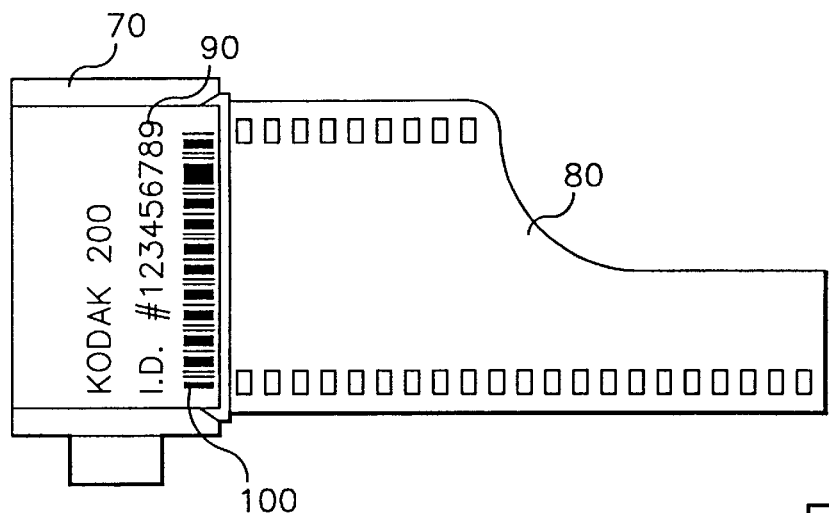
FIG. 2 is a top view of a film cassette with human and machine readable unique ID code.

Referring to FIG. 1, one-time use camera (OTUC) 10 useful with the present invention is shown. The OTUC 10 includes a shutter release button 20, a viewfinder 30, lens 40, electronic flash 50, electronic flash "on" switch 60, and film advance mechanism 65. Referring to FIG. 2, according to a preferred embodiment of the present invention, the OTUC 10 contains a film cartridge 70, imprinted with a human readable unique film ID number 90, a corresponding machine readable film ID number 100 and an unexposed film strip 80. The film cartridge can be a 35 mm film cartridge or an 240IX Advanced Photo System (Advantix) type film cartridge. The machine readable film ID number 100 can be an optically readable bar code on the film cartridge 70 as shown. In addition an optical code can be recorded on the film, or in the case of the Advantix type film, magnetically recorded on a magnetic recording layer on the film.

According to an alternative embodiment of the present invention, the film cassette 70 is provided with the aforementioned features for use with the user's traditional, reloadable camera.

According to a further alternative embodiment, the unique ID number is stored in a non-volatile memory in an integrated circuit chip that is attached to the film cassette. The chip is provided with external contacts that enable the chip to be read by a machine, in the same way as the chips used in smart credit cards.

Figure 3:
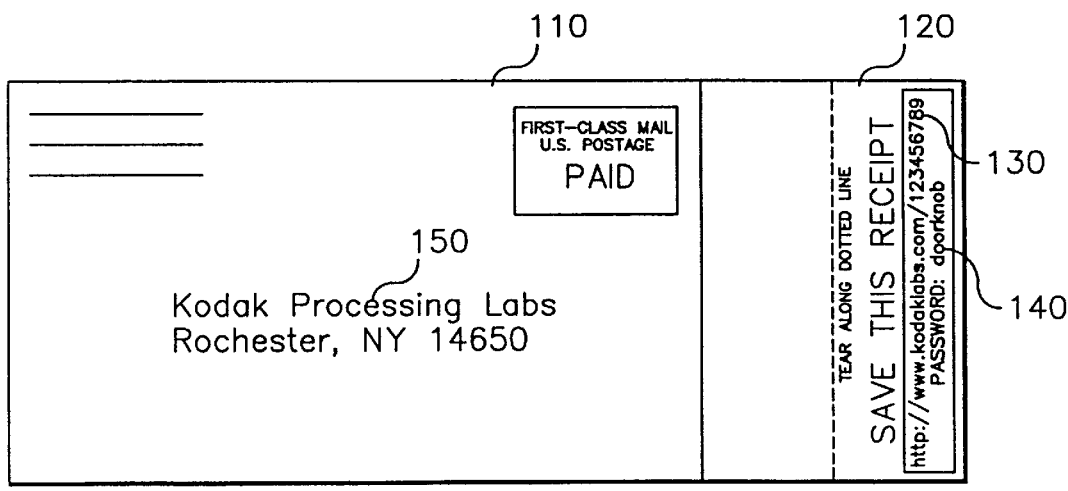
FIG. 3 is a front view of a pre-paid processing mailing envelope with a detachable receipt encoded with a human readable unique ID, matched to the film cassette, and including a password.

Referring to FIG. 3, the system of the present invention employs a pre-paid processing envelope (mailer) 110 that is sold in combination with the OTUC or roll of film. The mailer 110 has a tear off tab 120, imprinted with a unique Uniform Resource Location (URL) address 130 and a password 140. The film ID number is part of, or a reference to the URL address that will be used to acquire the images via the Internet as described below. Prepaid mailer 110 is also imprinted with a mailing address 150 of a film processing laboratory. For security purposes, the password is included only on the tear off receipt and in a database provided to the film processing laboratory by the film manufacturer. The prepaid mailer 110 may also have an area 155 for the user to write an e-mail address if e-mail notification or e-mail delivery of the resulting images is also desired.

Alternatively, a receipt in the form of a ticket, card, or removable label imprinted with the URL and password information may be provided with the film or OTUC instead of a pre-paid mailer. This would be used in conjunction with an affiliated retailer that would forward the film to a photofinishing lab that provides the service or the retailer may perform the service in house if the retailer is an affiliated photofinisher. This is the current procedure in the photographic industry for providing specialty photofinishing services. Photofinishing labs that offer "ColorWatch" photo service guarantee to the user that Kodak manufactured paper and chemistry, and Kodak approved photofinishing procedures are observed. For the user to obtain "ColorWatch" photofinishing he/she must locate a retailer that provides this service.

Figure 4:
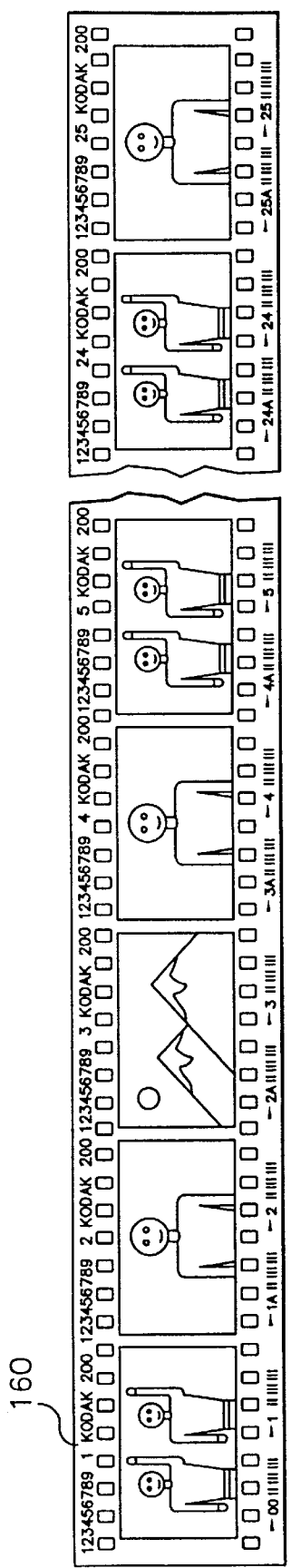
FIG. 4 is a front view of a processed film strip.
Figure 5:
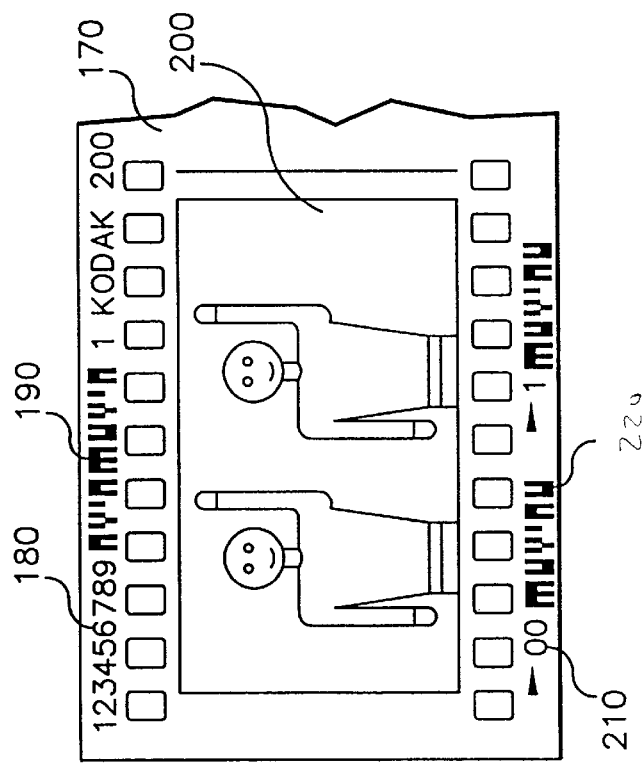
FIG. 5 is an enlarged front view of a single image frame from a processed film strip.

FIG. 4 shows a processed film strip 160 and FIG. 5 shows a close up view of a section 170 of processed film strip 160. As shown in FIG. 5, the processed film strip includes the human readable unique ID code 180 and a machine readable bar-coded unique film ID code 190. For each image 200, the film may also include an eye readable film frame number 210, and a machine readable frame number 220. Alternatively, the machine readable unique ID code 190 may be magnetically encoded on a transparent magnetic layer on the film strip.

Figures 6, 6A:
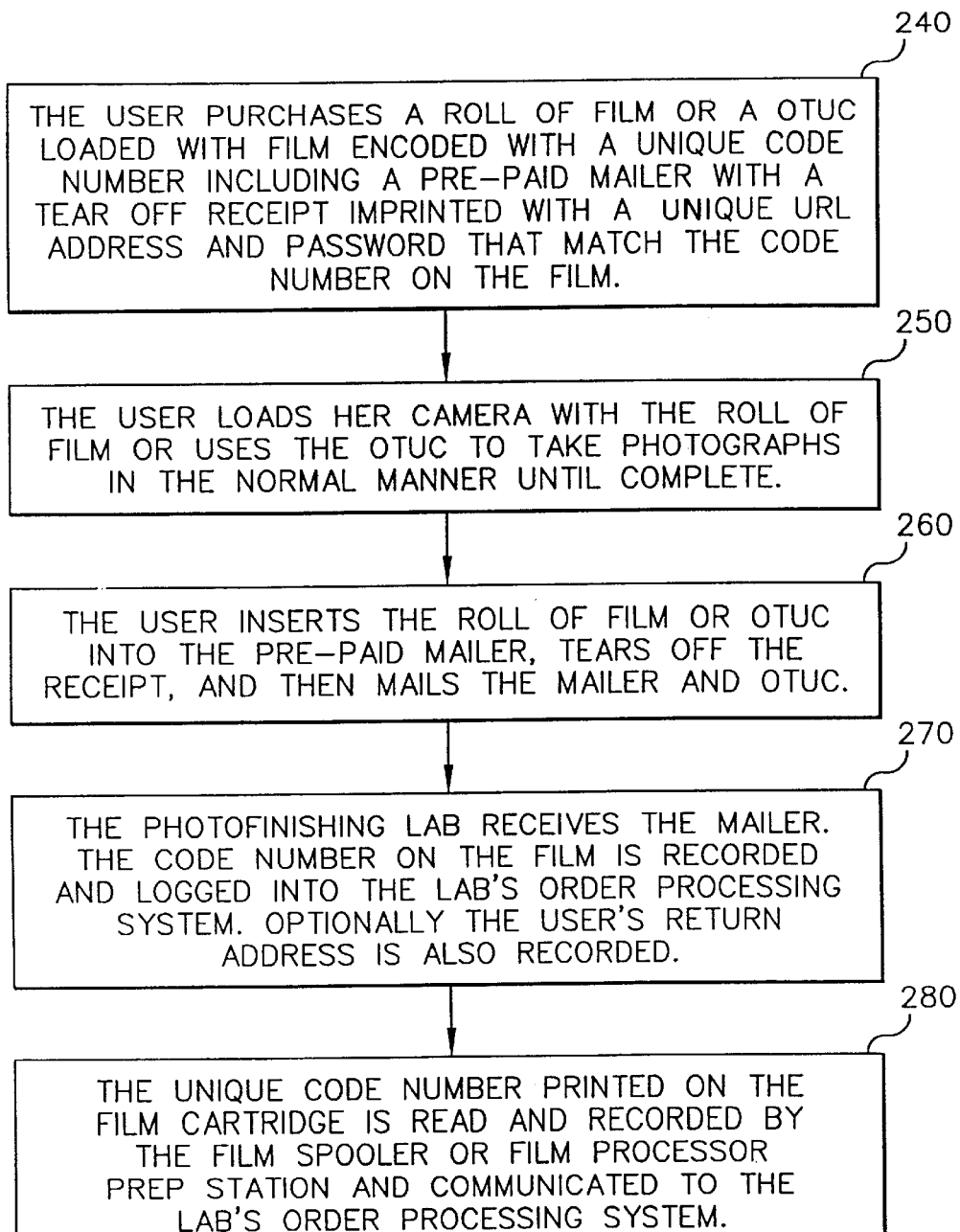
FIG. 6 is a flow chart depicting the sequence of operation for one embodiment of the method of the present invention.
Figure 6B:
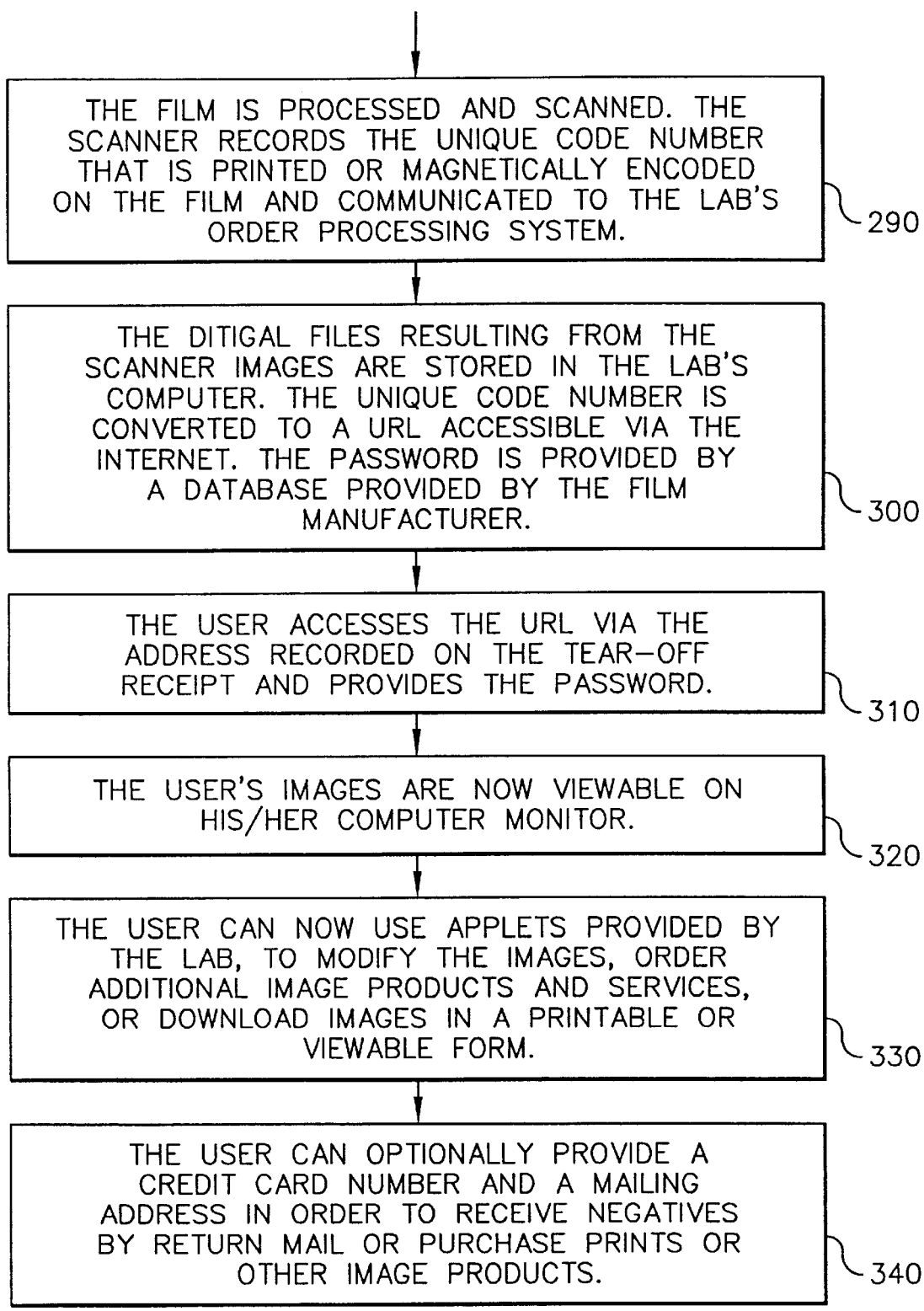

Referring to FIG. 6, the steps employed in using the system of the present invention will be described. First, in step 240, the user purchases an OTUC loaded with film or a 35 mm or 240IX film cassette encoded with a unique ID code for use in a conventional camera; a pre-paid mailer with a tear off receipt imprinted with a unique URL address that includes the code on the film and a password associated with the unique code. Next, in step 250, the user takes photographs with the OTUC or conventional camera in the normal manner. When the exposures are complete at step 260, the user removes the tear off receipt, inserts the OTUC or film roll into the pre-paid mailer and mails it to the photofinisher. Alternatively, the user may go directly to a retail affiliated photofinishing provider that offers this service and request the service. At step 270 the photofinisher reads the code from the mailer and logs the code into the photofinisher's order processing system. Optionally, the photofinisher records the photographer's home address from the mailer. At step 280 the photofinisher reads the unique code printed on the film cartridge and records the code number at the film spooler or film processor prep station and communicates the code number to the photofinisher's order processing system. At step 290 the film is processed and scanned by the photofinisher and the unique code number is read by the scanner and sent to the photofinisher's order processing station.

The code on the mailer is used to link the user's name and address to the film ID number. The film and mailer are transferred to an "order bag" used to transport the mailer, film, and resulting print and/or other image products through the photofinishing lab. The code on the cassette is used to link the "twin check" number assigned to the film to the photofinishing order bag. The code on the film strip is used once the film has been processed by the scanner to automatically assign the URL. With magnetically encoded film, the film does not have to be processed for the magnetic code to be readable.

At step 300 the magnetically encoded and/or bar-coded film ID number is read and the scanned images are automatically stored in the photofinisher's computer in a password protected URL access account with the film ID number designation. The digital images are accessible via the Internet, and the password associated with the URL is obtained from a secure database provided by the film manufacturer.

At step 310 a few days (or hours if a retail provider with in house processing, scanning, and digital transmission capabilities is used) may have elapsed before the user uses his computer and Internet browser to access his/her images from any computer having access to the world wide web using the unique URL and the security code that was provided on the tear off tab. At step 320 the images are sent to the user's computer and the user views the images. At step 330 using applets provided by the photofinisher, the user may now download, manipulate, store and/or print images using any viewing or printing equipment available at the viewing site. At step 340 the user may optionally submit a credit card number and purchase additional prints or image products and have them sent to any address indicated by the user.

Figure 7:
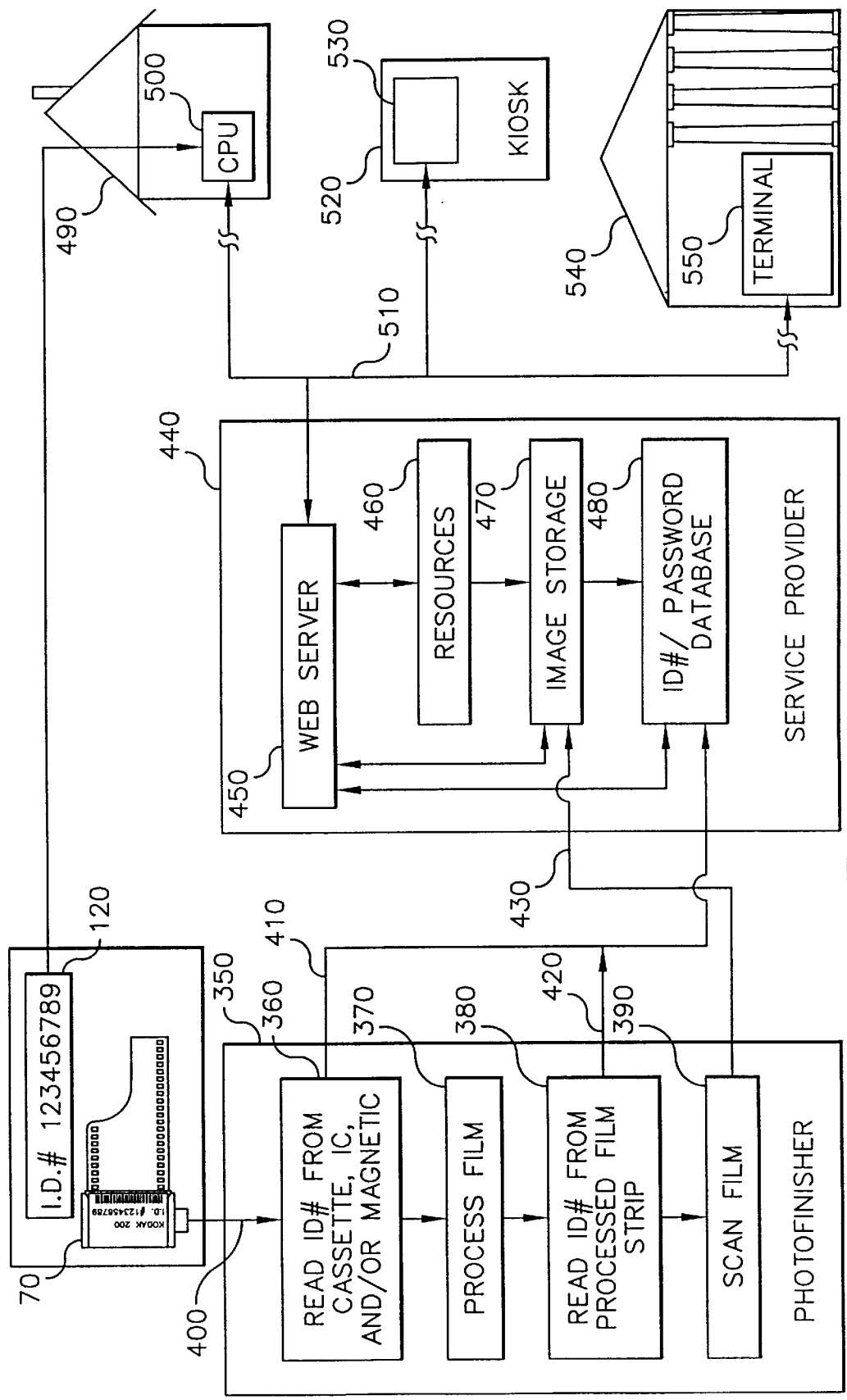
FIG. 7 is a block diagram depicting a system architecture of the present invention.

As shown in FIG. 7, the system architecture of the present invention also includes a photofinisher 350 to process the film delivered 400 to the photofinisher 350, scan the processed images to generate digital images, read the film ID code from the mailer, the film cartridge, or from the processed film, and associate the film ID code with the digital images. The system also includes an Internet service provider 440 that manages a web server 450, and includes an image storage file 470 and a database 480 containing film ID codes and associated passwords retrievable with the unique URL. The web service provider may also provide resources 460 via Java (or equivalent) applications, such as "KIA's Power Goo", Adobe Photoshop, a Cartoon Algorithm, a Coloring Book Algorithm, Zoom, Crop, Rotate, Email, Album Page, Post Card, etc. These resources are not downloadable and work only with the images located in the image storage file 470.

The photofinishing center 350 includes an order entry station 360 for reading the ID code from the mailer 110 or the film cartridge 70 and inputting any customer instructions prior to film development. The photofinishing center 350 includes a film processor 370 wherein the film is developed in the known manner. Several of the stations are provided with a network connection 410, 420 to the centralized service provider 440. If the film contains a magnetic stripe with the unique ID code, the developed film from the film processor 370 is forwarded to a magnetic stripe reader 380 which reads the unique ID from the processed film strip. After reading the unique ID code, the developed film is forwarded to a photo imaging workstation (PIW) 390 for example one of the several PhotoCD PIWs manufactured by Eastman Kodak Company for writing PhotoCD discs and making index prints. The PIW 390 is used to scan the developed film strip to generate digital images and to transform the digital images into a hierarchical digital format. The digital images are transferred 430 to an image storage 470. As part of that process a digital index file of low resolution digital prints is formed representing all of the scanned images appearing on the developed filmstrip. U.S. Pat. No. 5,184,227 issued Feb. 2, 1993 to Foley discloses a system that scans a film strip and forms a digital index print which contains a plurality of images corresponding to the images on the film strip. The digital index print at that point may be forwarded to a photographic printer (not shown) for hard copy generation. U.S. Pat. No. 5,400,152 issued Mar. 21, 1995 to Manico et al. discloses a similar system for quickly scanning a film strip, digitizing the images scanned, and forming a digital index print file that is optically printed as a low resolution representation of the images appearing on the film strip.

If the film contains a magnetic stripe, the magnetic stripe reader 380 senses the existence of a unique ID on a strip of film which indicates that the customer wants to preview the images on the film strip prior to having hard copy prints made. Upon sensing the unique ID code, the film strip is forwarded to the PIW 390 for scanning (conversion to a digital form). The digital file, representing the images on the film strip and including the digital index file, along with the associated unique ID code is forwarded to the central service provider 440 for storage in a large scale, long term image storage memory 470. If the film processor 370 does not sense the unique ID code, either on the film itself, or on a magnetic layer on the film, the digital file is forwarded, in the normal manner, to the photographic printer (not shown) for the printing of hard copy prints.

Upon receipt of the digital file, the service provider makes the file available at the URL address associated with the unique ID code under the protection of the password. The file can then be accessed by the customer from any terminal having access to the world wide web. The customer can access the communication channel 510 for example via public access terminals 550 such as may be found in a public library 540, or other public building. Access is also available via customer-operated kiosks 520 having a CPU 530 placed at retail locations.

If the customer has also provided an e-mail address on the mailer 110, the service provider 440 may send an e-mail message to the customer on the world wide web communication channel 510 indicating that the images are ready for viewing. The customer, at a convenient time, can then access the communication channel 510 to view the digital file on the monitor of the customers home computer 500 located in customer's home 490.

The customer may electronically order prints of the digital images directly from any point of access 500, 520, 550 to the communication channel 510 using the appropriate software. The packaged order is then delivered to the address supplied by the customer using any convenient form of shipment. The customer may authorize anyone else to view the files and order prints merely by sharing the URL and the password.

The invention has been described in detail with particular reference to certain preferred embodiments thereof, but it will be understood that variations and modifications can be effected within the spirit and scope of the invention.

10 One Time Use Camera (OTUC)
20 Shutter release button
30 Viewfinder
40 Lens
50 Electronic Flash
60 Flash charging switch
70 Film cassette
80 Film strip
90 Eye readable film ID code
100 Machine readable ID code
110 Pre-paid film/OTUC mailer
120 Tear off receipt with URL address and password
130 URL address
140 Password
150 Photofinisher mailing address
160 Processed film strip
170 Section of processed film strip
180 Eye readable film ID code
190 Machine readable ID code
200 Image
210 Eye readable film frame number
220 Machine readable frame number
240 User purchases film/OTUC step
250 User takes photographs
260 User sends film to photofinisher step
270 Photofinisher receives film step
280 ID number recorded from cassette step
290 Film processed, scanned, and ID number recorded step
300 Digital image files stored and tagged with ID number step
310 User accesses images via Internet and receipt URL and password step
320 Images viewable to user step
330 User manipulates images step
340 User optionally orders image products step
350 Photofinisher
360 ID read from cassette
370 Process film
380 ID from processed film strip
390 Film scanning
400 Film delivery
410 ID data transfer from cassette to database
420 ID data transfer from film strip to database
430 Digital image transfer from scanner to storage device
440 Service provider
450 Web server
460 Resources
470 Image storage
480 ID/Password database
490 User's home
500 Personal computer CPU
510 Communication channel
520 Kiosk
530 Kiosk CPU
540 Public building
550 Public CPU

What is claimed is:

1. A photographic system, comprising:
   a) a photographic film having a unique identification code thereon;
   b) an identification tag included with the photographic film, the identification tag bearing a uniform resource locator that includes the unique identification code, and an associated password;
   c) a scanner for scanning the film after processing to generate a digital image;
   d) means for associating the unique identification code with the digital image;
   e) a digital image storage device for storing the digital image;

f) a web server connected to the digital image storage device, having means for accessing the digital image using the uniform resource locator;

g) a database accessible by the web server having stored therein the unique identification code and the associated password; and h) wherein the means for accessing the digital image is password protected and accessible by use of the password.

2. The photographic system claimed in claim 1, wherein the film is in a one-time-use camera.

3. The photographic system claimed in claim 1, wherein the identification tag is removably attached to packaging associated with the film.

4. The photographic system claimed in claim 1, wherein the film is contained in a cassette and the cassette also bears the unique identification code.

5. The photographic system claimed in claim 1, wherein the scanner includes means for automatically reading the unique identification code on the film.

6. The photographic system claimed in claim 1, wherein the film includes a magnetic layer and the unique identification code is stored in the magnetic layer.

7. The photographic system claimed in claim 1, wherein the unique identification code is exposed on the film as a latent image.

8. The photographic system claimed in claim 1, wherein the unique identification code is both human and machine readable.

9. The photographic system claimed in claim 4, wherein the cassette includes an integrated circuit and the unique identification code is stored in the integrated circuit.

10. A method of delivering photographic services comprising the steps of:

a) providing a photographic film having a unique identification code thereon;

b) providing an identification tag included with the photographic film, the identification tag bearing a uniform resource locator (URL) that includes the unique identification code, and an associated password;

c) exposing and processing the film d) scanning the film after processing to generate a digital image;

e) associating the unique identification code with the digital image;

f) storing the digital image in a password protected URL access account accessible by using the URL and the password; and g) accessing the digital images in the URL access account via the Internet using the URL and the password.

11. The method claimed in claim 10, wherein the film is in a one-time-use camera.

12. The method claimed in claim 10, wherein the identification tag is removably attached to packaging associated with the film.

13. The method claimed in claim 10, wherein the film is contained in a cassette and the cassette also bears the unique identification code.

14. The method claimed in claim 10, wherein the scanner includes means for automatically reading the unique identification code on the film.

15. The method claimed in claim 10, wherein the film includes a magnetic layer and the unique identification code is stored in the magnetic layer.

16. The method claimed in claim 10, wherein the unique identification code is exposed on the film as a latent image.

17. The method claimed in claim 10, wherein the unique identification code is both human and machine readable.

18. The method claimed in claim 13, wherein the cassette includes an integrated circuit and the unique identification code is stored in the integrated circuit.

* * * * *